United States Patent [19]

Henrick et al.

[11] 3,911,025

[45] Oct. 7, 1975

[54] ALKYNYL ALCOHOLS

[75] Inventors: Clive A. Henrick; John B. Siddall, both of Palo Alto, Calif.

[73] Assignee: Zoecon Corporation, Palo Alto, Calif.

[22] Filed: Jan. 7, 1974

[21] Appl. No.: 431,522

Related U.S. Application Data

[60] Division of Ser. No. 266,091, June 26, 1972, Pat. No. 3,801,611, which is a continuation-in-part of Ser. No. 187,897, Oct. 8, 1971, Pat. No. 3,755,411.

[52] U.S. Cl........... 260/615 R; 252/56 R; 260/89.3; 260/410; 260/601 N; 260/602; 260/884; 260/885; 260/633; 424/312; 424/314

[51] Int. Cl.$^2$............ C07C 43/00; C07C 43/14

[58] Field of Search............... 260/615 R

[56] References Cited

OTHER PUBLICATIONS

Garaevz et al., Chem Abs. 67 32287 y (1967).

*Primary Examiner*—Howard T. Mars
*Attorney, Agent, or Firm*—Donald W. Erickson

[57] ABSTRACT

Aliphatic substituted allenic and diolefinic esters, intermediates therefor, derivatives thereof and the control of insects.

6 Claims, No Drawings

ALKYNYL ALCOHOLS

This is a division of Ser. No. 266,091, filed June 26, 1972, now U.S. Pat. No. 3,801,611, which is a continuation-in-part of Ser. No. 187,897, filed Oct. 8, 1971, now U.S. Pat. No. 3,755,411.

This invention relates to novel aliphatic substituted di-olefinic esters, novel acetylenic and allenic intermediates therefor, and novel derivatives thereof, useful in the control of insects.

More particularly, the novel di-olefinic compounds of the present invention are represented by the following formula A:

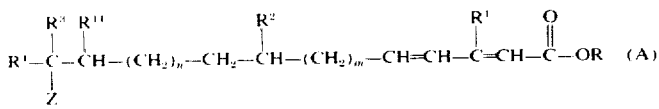

wherein,

Z is fluoro, chloro, hydroxy, or lower alkoxy;

each of $m$ and $n$ is zero or the positive integer one, two or three;

each of R, $R^2$ and $R^3$ is lower alkyl;

$R^4$ is alkyl; and each of $R^1$ and $R^{11}$ is hydrogen or lower alkyl.

Esters of formula (A) can be prepared as outlined below:

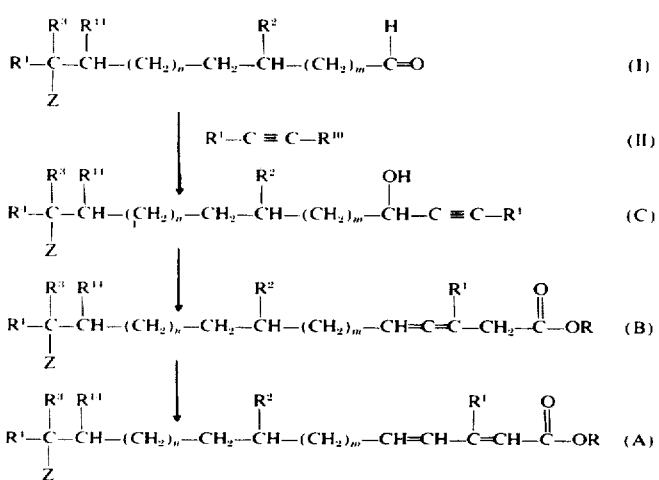

$R^{10}$ is a metal such as lithium, sodium, potassium or magnesium.

In the above outlined synthesis, an aldehyde of formula I is reacted with an alkynylide of formula II to produce the alkynyl alcohol of formula C which is then reacted with a trialkylorthoester in the presence of weak acid catalyst to yield an allenic ester of formula B. The 3,4-allene B is rearranged to the 2,4-diene A by treatment with base. Preparation of alkynyl alcohols is described by Kimel et al., *J. Org. Chem.* 22, 1611 (1957). The conversion of alkynyl alcohols to allenic esters is reported by Crandall et al, *Chem. Commun.*, 1411 (1970) and our application Ser. No. 111,768, filed Feb. 1, 1971.

The starting material aldehydes of formula I are prepared according to the procedures described in our pending application Ser. No. 187,897, filed Oct. 8, 1971, the disclosure of which is incorporated by reference.

The compounds of formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Aphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 µg. to 10 µg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of formula A. Generally, a concentration of less than 25% of the active compound is employed. The formulations can include insect attractants, emulsifying agents or wetting agents to assist in the application and effectiveness of the active ingredient.

In addition to the compounds of formula A having activity useful for the control of insects, the compounds of formula A have numerous other useful applications. For example, the esters of formula A and the allenic esters of formula B of the present invention are useful lubricants and plasticizers for polymers, such as SBR, polybutadiene, ethylene-propylene copolymers and polypropylene and aid in the processing and application of polymers.

The term "alkyl", as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl.

The term "lower alkyl", as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The term "lower alkoxy", as used herein refers to a branched or straight chain saturated aliphatic hydrocarbon group, having a chain length of 1 to 6 carbon atoms, with an oxygen atom bonded to the C-1 carbon atom, such as methoxy, ethoxy, isopropoxy and t-butoxy, preferably, lower alkoxy of one to 3 carbon atoms.

The presence of an olefinic bond at position C-2 and C-4 of the compounds of formula A gives rise to four isomers, each of which is embraced by the present invention. A mixture of isomers is suitably employed for the control of insects such as a mixture containing the trans (2), trans (4) isomer and the cis (2), trans (4) isomer. The conditions of the synthesis described herein and the reactants can be selected so as to favor formation of one isomer such as the all trans isomer over the formation of other isomers. The selection of appropriate conditions and reactants to favor formation of one isomer over another will be apparent to those of ordinary skill in the art giving due consideration to the specific examples hereinafter. In the specific examples hereinafter, when isomerism is not specified, it is understood to include a mixture of isomers which, if desired, can be separated using known separation methods.

The following examples are provided to illustrate the practice of the present invention. Temperature is given in degrees Centigrade.

EXAMPLE 1

A. To magnesium propynylide (15 g.) in 150 ml. of ether is slowly added 0.3 moles of 7-methoxy-3,7-dimethyloctan-1-al, at 0° and the mixture then stirred overnight. Saturated aqueous ammonium chloride is added and the layers separated. The organic phase, combined with ether backwashings of aqueous phase, is washed with water, dried and solvent evaporated to yield 10-methoxy-6,10-dimethylundec-2-yn-4-ol which can be purified by chromatography.

B. A mixture of 18.5 g. of the alkynyl alcohol of part A, 80 g. of triethylorthoacetate and 0.7g. of propionic acid is refluxed under a spinning band column to remove ethanol as it is formed. After the elimination of ethanol is about complete, the crude reaction product is distilled under vacuum to yield ethyl 11-methoxy-3,7,11-trimethyldodeca-3,4-dienoate. Alternatively, the crude reaction product is purified by chromatography on silica.

C. A solution of 1.0 g. of the allenic ester of part B in 20 ml. of ethanol is treated with 4 ml. of aqueous 2N sodium hydroxide and left at room temperature for several minutes. The mixture is then poured into pentane and washed with saturated brine and separated. Evaporation of the organic phase yields ethyl 11-methoxy-3,7,11-trimethyldodeca-2,4-dienoate.

EXAMPLE 2

The process of Example 1, part A, is repeated using each of the aldehydes under column I as the starting material to yield the respective alkynyl alcohol under column II, each of which is reacted with triethylorthoacetate using the process of Example 1, part B, to prepare the respective allenic ester under column III.

I 7-ethoxy-3,7-dimethylnonan-1-al
7-ethoxy-3-methyl-7-ethylnonan-1-al
7-ethoxy-3,7-diethylnonan-1-al
8-ethoxy-4,8-dimethylnonan-1-al
6-ethoxy-3,6-dimethylheptan-1-al
6-ethoxy-3,6-dimethyloctan-1-al
6-ethoxy-2,6-dimethylheptan-1-al

II 10-ethoxy-6,10-dimethyldodec-2-yn-4-ol
10-ethoxy-6-methyl-10-ethyldodec-2-yn-4-ol
10-ethoxy-6,10-diethyldodec-2-yn-4-ol
11-ethoxy-7,11-dimethyldodec-2-yn-4-ol
9-ethoxy-6,9-dimethyldec-2-yn-4-ol
9-ethoxy-6,9-dimethylundec-2-yn-4-ol
9-ethoxy-5,9-dimethyldec-2-yn-4-ol

III ethyl 11-ethoxy-3,7,11-trimethyltrideca-3,4-dienoate
ethyl 11-ethoxy-3,11-dimethyl-7-ethyltrideca-3,4-dienoate
ethyl 11-ethoxy-3-methyl-7,11-diethyltrideca-3,4-dienoate
ethyl 12-ethoxy-3,8,12-trimethyltrideca-3,4-dienoate
ethyl 10-ethoxy-3,7,10-trimethylundeca-3,4-dienoate
ethyl 10-ethoxy-3,7,10-trimethyldodeca-3,4-dienoate
ethyl 10-ethoxy-3,6,10-trimethylundeca-3,4-dienoate Using the process of Example 1, part C, each of the allenic esters under column III is rearranged by treatment with aqueous sodium hydroxide to produce the respective α,β-unsaturated ester.

EXAMPLE 3

Following the process of part A of Example 1, magnesium acetylide is reacted with 7-isopropoxy-3,7-dimethyloctan-1-al as well as the isopropoxy derivative of each of the aldehydes under column I to produce the respective alkynyl alcohol under column IV.

IV 9-isopropoxy-5,9-dimethyldec-1-yn-3-ol
9-isopropoxy-5,9-dimethylundec-1-yn-3-ol
9-isopropoxy-5-methyl-9-ethylundec-1-yn-3-ol
9-isopropoxy-5,9-diethylundec-1-yn-3-ol
10-isopropoxy-6,10-dimethylundec-1-yn-3-ol
8-isopropoxy-5,8-dimethylnon-1-yn-3-ol
8-isopropoxy-5,8-dimethyldec-1-yn-3-ol
8-isopropoxy-4,8-dimethylnon-1-yn-3-ol Each of the alkynyl alcohols under column IV is reacted with triethylorthoacetate using the procedure of Example 1, part B, to prepare the respective allenic ester under column V.

V ethyl 11-isopropoxy-7,11-dimethyldodeca-3,4-dienoate ethyl 11-isopropoxy-7,11-dimethyltrideca-3,4-dienoate
ethyl 11-isopropoxy-7-ethyl-11-methyltrideca-3,4-dienoate
ethyl 11-isopropoxy-7,11-diethyltrideca-3,4-dienoate
ethyl 12-isopropoxy-8,12-dimethyltrideca-3,4-dienoate
ethyl 10-isopropoxy-7,10-dimethylundeca-3,4-dienoate
ethyl 10-isopropoxy-7,10-dimethyldodeca-3,4-dienoate
ethyl 10-isopropoxy-6,10-dimethylundeca-3,4-dienoate Each of the allenic esters under column V is rearranged by treatement with aqueous sodium hydroxide to prepare the respective $\alpha,\beta$-unsaturated ester.

EXAMPLE 4

A. To magnesium propynylide (15g.) in 150 ml. of ether is slowly added 0.3 moles of 7-hydroxy-3,7-dimethyl-1-octanal and the mixture stirred overnight at 0°. Saturated aqueous ammonium chloride is added and the layers separated. The organic phase, combined with ether backwashings of aqueous phase, is washed with water, dried and solvent evaporated to yield 10-hydroxy-6,10-dimethylundec-2-yn-4-ol which can be purified by distillation or chromatography.

B. A mixture of 18.5 g. of 10-hydroxy-6,10-dimethylundec-2-yn-4-ol, 80 g. of triethylorthoacetate and 0.75 g. of propionic acid is refluxed under a spinning band column to remove ethanol as it is formed. After the elimination of ethanol is about complete, the crude reaction product is distilled under vacuum to yield ethyl 11-hydroxy-3,7,11-trimethyldodeca-3,4-dienoate. Alternatively, the crude reaction product is purified by chromatography on silica.

C. A solution of 1.0 g. of the allenic ester of part B in 20 ml. of ethanol is treated with 4 ml. of aqueous 2N sodium hydroxide and left at room temperature for several minutes. The mixture is then poured into pentane and washed with saturated brine and separated. Evaporation of the organic phase yields ethyl 11-hydroxy-3,7,11-trimethyldodeca-2,4-dienoate.

EXAMPLE 5

The process of part A of Example 4 is repeated using each of the aldehydes under column VI to produce the respective alkynyl alcohol under column VII.

VI 7-fluoro-3,7-dimethylnonan-1-al
7-fluoro-3,7-dimethyloctan-1-al
5-fluoro-2,5-dimethylhexan-1-al
6-fluoro-3,6-dimethylheptan-1-al

VII 10-fluoro-6,10-dimethyldodec-2-yn-4-ol
10-fluoro-6,10-dimethylundec-2-yn-4-ol
8-fluoro-5,8-dimethylnon-2-yn-4-ol
9-fluoro-6,9-dimethyldec-2-yn-4-ol The alkynyl alcohols under column VII are reacted with triethylorthoacetate to produce the respective allenic ester under column VIII which are rearranged ro produce the respective $\alpha,\beta$-unsaturated esters.

VIII ethyl 11-fluoro-3,7,11-trimethyltrideca-3,4-dienoate
ethyl 11-fluoro-3,7,11-trimethyldodeca-3,4-dienoate
ethyl 9-fluoro-3,6,9-trimethyldeca-3,4-dienoate
ethyl 10-fluoro-3,7,10-trimethylundeca-3,4-dienoate

EXAMPLE 6

Following the procedure of Example 4 (A) sodium acetylide is reacted with each of the chloro derivatives of the aldehydes under column VI to produce the respective alkynyl alcohol under column IX.

IX 9-chloro-5,9-dimethylundec-1-yn-3-ol
9-chloro-5,9-dimethyldec-1-yn-3-ol
7-chloro-4,7-dimethyloct-1-yn-3-ol
8-chloro-5,8-dimethylnon-1-yn-3-ol Each of the alkynyl alcohols under column IX is then reacted with triethylorthoacetate to produce the respective allenic ester under column X which are rearranged to produce the respective 2,4-dienoate.

X ethyl 11-chloro-7,11-dimethyltrideca-3,4-dienoate
ethyl 11-chloro-7,11-dimethyldodeca-3,4-dienoate
ethyl 9-chloro-6,9-dimethyldeca-3,4-dienoate
ethyl 10-chloro-7,10-dimethylundeca-3,4-dienoate The use of trimethylorthoacetate in the foregoing examples in place of triethylorthoacetate produces the corresponding methyl esters.

EXAMPLE 7

A. To 46 g. of lithium propynylide in 700 ml. of dimethylformamide, cooled in an ice-bath, is added a solution of 60 g. of 7-methoxy-3,7-dimethyloctan-1-al in 300 ml. of dimethylformamide over a period of 3 hours. The mixture is stirred at room temperature overnight. The reaction is worked up by adding 500 ml. of saturated aqueous ammonium chloride and extracting with ether. The organic phase is washed well with water, dried over calcium sulfate and the solvent is evaporated at reduced pressure to yield 10-methoxy-6,10-dimethylundec-2-yn-4-ol, which can be purified by distillation.

B. A mixture of 2 g. of the alkynyl alcohol of Part A, 11.5 ml. of triethylorthoacetate and 0.05 g. of propionic acid is heated to 120°–130° under a spinning band column for about 3 hours. The crude reaction product is then distilled under vacuum to give ethyl 11-methoxy-3,7,11-trimethyldodeca-3,4-dienoate.

C. To 100 mg. of the allenic ester of Part B in 10 ml. of dimethylformamide, at −15°, is added 20 mg. of sodium ethoxide. The mixture is left at room temperature for 2 days. Water and ether is added and the organic layer separated, washed with brine, dried and evaporated to yield ethyl 11-methoxy-3,7,11-trimethyldodeca-2,4-dienoate.

By use of tri-isopropylorthoacetate in place of triethylorthoacetate in Part B, there is obtained the isopropyl allenic ester which upon rearrangement with the basic treatment of Part C, affords isopropyl 11-methoxy-3,7,11-trimethyldodeca-2,4-dienoate.

EXAMPLE 8

Five grams of 7-hydroxy-3,7-dimethyloctan-1-al are processed as described in Example 7, Parts A and B, to give 10-hydroxy-6,10-dimethylundec-2-yn-4-ol and ethyl 11-hydroxy-3,7,11-trimethyldodeca-3,4-dienoate successively.

To the allenic ester thus-prepared (500 mg.) in 10 ml. of ethanol is added 5 ml. of a 40% methanolic solution of N-benzyltrimethylammonium hydroxide (Triton B) and the mixture is allowed to stand at room temperature for 5 hours. The reaction is worked up as in Part C of Example 7 to yield ethyl 11-hydroxy-3,7,11-trimethyldodeca-2,4-dienoate.

Substituting triethylorthoacetate by each of trimethylorthoacetate and tri-isopropylorthoacetate yields the corresponding methyl and isopropyl allenic esters which are ultimately converted into the respective methyl and isopropyl 2,4-dienoates.

What is claimed is:

1. A compound selected from those of the following formula:

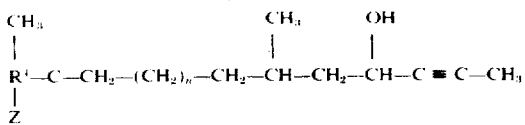

wherein, $n$ is zero or one;

$R^1$ is methyl or ethyl; and

Z is lower alkoxy of one to three carbon atoms.

2. A compound according to claim 1 wherein n is one and Z is methoxy or ethoxy.

3. The compound, 10-methoxy-6,10-dimethylundec-2-yn-4-ol, according to claim 1.

4. The compound, 10-ethoxy-6,10-dimethyldodec-2-yn-4-ol, according to claim 1.

5. The compound, 9-ethoxy-6,9-dimethyldec-2-yn-4-ol, according to claim 1.

6. The compound, 9-ethoxy-6,9-dimethylundec-2-yn-4-ol, according to claim 1.

* * * * *